United States Patent Office 3,324,158
Patented June 6, 1967

3,324,158
N-(2-HYDROXYPHENYLMETHYLENE)-2-HYDROXY-ORGANO-ARYL AMINE AND METAL SALTS THEREOF
Henryk A. Cyba, Evanston, and Robert H. Rosenwald, Western Springs, Ill., assignors to Universal Oil Products Company, Des Plaines, Ill., a corporation of Delaware
No Drawing. Filed June 17, 1963, Ser. No. 288,439
9 Claims. (Cl. 260—439)

This invention relates to the stabilization of plastics and more particularly to a novel method of inhibiting deterioration of plastic caused by oxidation and ultraviolet light.

It is well known that most, if not all, plastics undergo deterioration when exposed to sunlight and air. The deterioration due to sunlight and the deterioration due to oxygen are separate phenomena as evidenced by the fact that either one may occur in the absence of the other. It may be that deterioration from one source enhances deterioration from the other source. In any event, it is important that both forms of deterioration be inhibited and the present invention provides a novel method for accomplishing this.

Recent advances in plastic technology have made available a large variety of plastics. A definition of plastic which seems to be accepted in the industry is that plastic comprises a large and varied group of materials which consist of, or contain as an essential ingredient, a substance of high molecular weight which, while solid in the finished state, in some stage in its manufacture is soft enough to be formed into various shapes usually through the application, either singly or together, of heat and pressure. Plastics generally are prepared by the condensation or polymerization of a single monomer or a mixture of monomers. The plastic may be classified further as being thermosetting or thermoplastic. Plastics also include solid polymers which, in turn, are defined as substances of high molecular weight composed of repeating units and exhibiting unique physical properties including one or more of high tensile strength, elasticity, ability to form fibers, etc. The polymers may be classified into two general types as (1) condensation and (2) addition polymers. The condensation polymers may be formed from a single monomer or from different monomeric reactants. An addition polymer is derived from multiple additions of an unsaturated monomer or monomers. As hereinbefore set forth, most, if not all, plastics undergo deterioration upon exposure to air and ultraviolet light, and the present invention provides a novel method of inhibiting such deterioration.

In a preferred embodiment the plastic comprises a solid olefin polymer. This may comprise homopolymers or copolymers of olefinic hydrocarbons including particularly polyethylene, polypropylene and polybutylene, as well as copolymers of ethylene and propylene, ethylene and butylene, and propylene and butylene. In addition, solid polymers prepared from one or more higher molecular weight olefins or mixtures may be stabilized in accordance with the present invention.

Deterioration of the solid olefin polymers when exposed to sunlight is characterized in its early stages by the breaking of the polymer chain and the formulation of carbonyl groups. As oxidation continues, the polymer cracks and loses tensile strength to the point of mechanical failure. For example, electrical insulation prepared from solid olefin polymers will undergo embrittlement, increase of power factor and loss of electrical resistance when used in exposed locations. Other examples of the use of solid olefin polymers subject to outdoor exposure are in the preparation of sheets which are used in draping open areas in building construction in order to protect the construction from the effect of weather and in the manufacture of light weight outdoor furniture, cover for greenhouses, awnings, etc. It is readily apparent that the fabricated product must be protected against deterioration caused by sunlight and air.

Another plastic available commercially on a large scale is polystyrene. Polymerization of styrene proceeds rapidly in an emulsion of 5% sodium oleate solution and results in high molecular weight polymers. In another method styrene is polymerized in the presence of aluminum trialkyls. In general, polystyrene is thermoplastic which, however, may be modified by effecting the polymerization in the presence of a small amount of divinylbenzene. The polystyrene-type resins are particularly useful in the manufacture of molded or machine articles which find application in such goods as windows, optical goods, automobile panels, molded household articles, etc. One disadvantage of polystyrene is its tendency to deteriorate when exposed to direct sunlight and air for extended periods of time.

Another class of plastics available commercially is broadly classed as vinyl resins and is derived from monomers such as vinyl chloride, vinyl acetate, vinylidine chloride, etc. Polyvinyl chloride plastics are available commercially on a large scale and undergo deterioration when exposed to sunlight. Other vinyl type resins include copolymers of vinyl chloride with acrylonitrile, methacrylonitrile, vinylidine chloride, alkyl acrylates, alkyl methacrylates, alkyl maleates, alky fumarates, etc.

Other plastics being used commercially on a large scale are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), saran (copolymer of vinylidine chloride and vinyl chloride), etc. Here again, deterioration of the solid polymer occurs due to ultraviolet light and oxidation.

Still other plastics are prepared from other monomers and are available commercially. Illustrative examples of such other solid polymers include phenolformaldehyde resins, urea-formaldehyde resins, melamine-formaldehyde resins, acryloid plastics which are derived from methyl, ethyl and higher alkyl acrylates and methacrylates as monomers used in the polymerization. Also included in the solid polymers are the polyurethane foams which are become increasingly available on a large scale and polyacetals, especially polyformaldehydes such as "Delrin" and "Celcon."

It is understood that the plastic may be fabricated into any desired finished product including moldings, castings, fibers, films, sheets, rods, tubing or other shapes.

Rubber is composed of polymers of conjugated 1,3-dienes, either as polymers thereof or as copolymers thereof with other polymerizable compounds, and the rubbers, both natural and synthetic, are included as solid polymers in the present specifications and claims. Synthetic rubbers include SBR rubber (copolymer of butadiene and styrene), Buna N (copolymer of butadiene and acrylonitrile), butyl rubber (copolymer of butadiene and isobutylene), neoprene rubber (chloroprene polymer), Thiokol rubber (polysulfide), silicone rubber, etc. The natural rubbers include Hevea rubber, caoutchouc, balata, guttapercha, etc. It is well known that rubber undergoes deterioration due to oxygen and, when exposed to direct sunlight for extended periods of time, also undergoes deterioration from this source.

In one embodiment the present invention relates to a method of stabilizing plastic normally subject to deterioration by oxidation and ultraviolet light which comprises incorporating in said plastic a small but stabilizing concentration of N-(2-hydroxyarylmethylene)-2-hydroxy-Y-arylamine inhibitor or metal salt thereof, where Y is selected from the group consisting of hydrocarbyl and hydrocarbyloxy of at least three carbon atoms.

In a specific embodiment the present invention relates to a method of stabilizing solid polymer normally subject to deterioration by oxidation and ultraviolet light which comprises incorporating in said polymer a small but stabilizing concentration of a nickel salt of N-salicylidene-2-hydroxy-5-alkylaniline in which said alkyl contains from five to about twenty carbon atoms.

In another embodiment the present invention relates to plastic subject to deterioration by oxidation and ultraviolet light containing, as an inhibitor against such deterioration, a stabilizing concentration of the inhibitor set forth herein.

It is believed that the inhibitors of the present invention are novel compositions of matter and, accordingly, are being so claimed in the present application.

The novel inhibitors of the present invention are N-(2-hydroxyarylmethylene) - 2 - hydroxy-Y-arylamines and metal salts thereof, the Y substituent being as hereinbefore defined. In one embodiment these inhibitors are prepared by the recation of an alkyl or alkoxy ortho-aminophenol with salicylaldehyde or a substituted salicylaldehyde. This reaction occurs with the liberation of water to form a Schiff's base. In one embodiment the Schiff's base is used as the inhibitor and in another embodiment the metal salt of the Schiff's base is used as the inhibitor. When the metal salt is prepared, it may be an acidic or mono salt which is formed by the reaction of two mole proportions of the Schiff's base with one mole proportion of a metal, the latter being reacted as a salt of the metal. When the metal salt is reacted in equal mole proportion with the Schiff's base, the resultant salt is the neutral salt. The salts also may be expressed as coordination complexes. It is understood that a mixture of the acidic and neutral salts may be formed and that such mixture may be used as such. Without intending to be limited thereto, it is believed that the metal salts of the Schiff's bases may be illustrated as shown below.

The neutral salt, formed by the reaction of equal mole proportions of nickel compound and a Schiff's base is believed to be as follows:

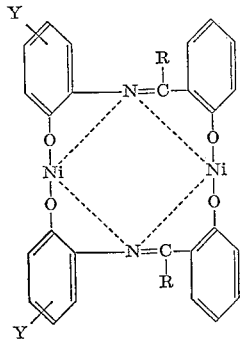

in which R is alkyl, phenyl, alkylphenyl or alkoxyphenyl.

The acidic or mono salt formed by the reaction of two mole proportions of a Schiff's base and one mole proportion of nickel compound is believed to comprise a mixture of the structures illustrated below:

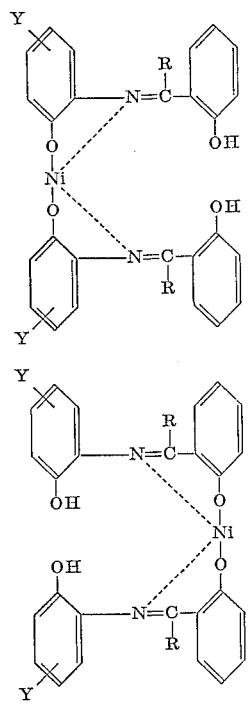

As hereinbefre set forth, Y in the above formula comprises one or more hydrocarbyl or hydrocarbyloxy groups, at least one of which contains at least three and preferably from about five to about twenty carbon atoms. It is understood that the other phenyl nucleus and/or methylene groups may contain hydrocarbyl and/or hydrocarbyloxy substituents attached thereto. In still another embodiment, 2-hydroxyacylphenones or 2-hyroxybenzophenones are used in place of salicylaldehyde for reaction with the substituted aminophenol.

As hereinbefore set forth, one of the reactants used in preparing the novel inhibitor of the present invention is a substituted ortho-aminophenol. It is essential that the ortho-aminophenol contain at least one hydrocarbyl or hydrocarbyloxy group of at least three carbon atoms and preferably of from five to twenty carbon atoms. In a preferred embodiment the substituent is an alkyl group of at least three and still more particularly of from about five to about twenty carbon atoms. In another preferred embodiment, the substituent is an alkoxy group of at least three and preferably of from about five to about twenty carbon atoms. In still another embodiment the substituent is selected from aralkyl, aryl, alkaryl, alkylcycloalkyl, cycloalkylalkyl, aryloxy, alkaryloxy, arylalkoxy, etc. When only one such substituent is attached to the aminophenol ring, it preferably is in the 4-position, although it may be in the 6-, 3- or 5-positions. When two or more of such substituents are present, at least one substituent preferably is in the 4-position and the other substituent or substituents will be in the 6- and/or 5-positions. While the substituted ortho-aminophenol is preferred, it is understood that, in another embodiment of the invention, the correspondingly substituted ortho-aminonaphthol may be used for reaction with salicylaldehyde or substituted salicylaldehyde, but not necessarily with equivalent results.

In one embodiment the substituted aminophenol is reacted with salicylaldehyde or a substituted salicylaldehyde. Here again, the substituents are selected from hydrocarbyl and hydrocarbyloxy groups and more particularly those hereinbefore specifically set forth in the previous paragraph. Particularly, preferred reactants in this embodiment include salicylaldehyde and ortho-vanillin (2-hydroxy-3-methoxybenzaldehyde). In another embodiment the substituted salicylaldehyde comprises a 2-hydroxyaryl alkyl ketone as illustrated by 2-hydroxyacetophenone, 2-hydroxypropiophenone, 2-hydroxybutyrophenone, 2-hydroxyvalerophenone, 2-hydroxycaprylophenone, 2-hydroxylaurylphenone, 2-hydroxypalmitylphenone, etc. In still another embodiment, the substituted salicylaldehyde comprises 2-hydroxybenzophenone, 2-hydroxy - 4'-alkylbenzophenone, 2-hydroxy - 4'-alkylbenzophenone, 2-hydroxy-4-alkoxybenzophenone, 2-hydroxy-4'-alkoxybenzophenone, etc.

The reaction of the substituted aminophenol and salicylaldehyde or substituted salicylaldehyde is effected in any suitable manner. While the reaction may be effected at room temperature or slightly above, it generally is preferred to effect the reaction at refluxing conditions. The exact temperature will depend upon the particular solvent employed. For example, when benzene is used as the solvent, the temperature is about 80° C. Correspondingly higher refluxing temperatures are employed when using toluene, xylene, ethyl benzene, cumene, etc., as the solvent. In another embodiment an alcohol solvent is used including methanol, ethanol, propanol, butanol, etc., or other oxygenated solvents as ethers, glycols, etc., may be used. Accordingly, the reaction temperature may be within the range of room temperature or slightly higher to 200° C. or more. Higher temperatures which may range up to 400° C. may be employed when the reaction is effected under superatmospheric pressure which may range from 10 to 1000 pounds per square inch or more. When desired, the substituted aminophenol and/or salicylaldehyde compound may be prepared as separate solutions in a solvent and introduced in this manner into the reaction zone, or either one or both of these compounds may be introduced into the reaction zone and the solvent separately supplied thereto. The refluxing or stirring of the heated reactants is continued for a time sufficient to effect substantially complete reaction, which time may range from 0.1 to 10 hours or more. In this reaction, water is formed and preferably is continuously removed from the reaction zone. Following completion of the reaction, the resultant Schiff's base may be separated from the solvent or may be allowed to remain in solution.

In another preferred embodiment the metal salt of the Schiff's base is used as the inhibitor. Any suitable metal salt may be used, the nickel salt being preferred. Other metals include copper, cobalt, lithium, antimony, cadmium, lead, tin, uranium (UO$_2$), vanadium, zinc, iron, mercury, etc. Any suitable metal compound is used in preparing the salt. A preferred compound of nickel is nickel chloride. Other soluble salts of nickel include nickel acetate tetrahydrate, nickel bromide trihydrate, nickel carbonyl, nickel chloride hexahydrate, nickel formate, nickel nitrate hexahydrate, nickel sulfate hexahydrate, etc. A preferred copper compound is cupric acetate hydrate. Other soluble salts of copper include cupric bromide, cupric butyrate, cupric chloride dihydrate, cupric acetoacetate, cupric formate, cupric nitrate trihydrate, cupric nitrate hexahydrate, cupric salicylate, etc. A preferred compound of cobalt is cobaltous sulfate monohydrate. Other soluble compounds of cobalt include cobaltous acetate, cobaltous bromide, cobaltous chloride, cobaltous iodide, cobaltous nitrate, etc.

The Schiff's base is reacted with the metal compound in any suitable manner. For example, the Schiff's base in alcoholic solution is first reacted with an alkali metal hydroxide alcoholic solution and then is reacted with nickel chloride. The reaction temperature generally will be in the range of from 20° C. to refluxing temperature which may be as high as 200° C. In certain cases, it is unnecessary to first react with an alkali metal hydroxide as, for example, when the lithium salt is prepared. Preferred alkali metal hydroxides comprise sodium hydroxide and potassium hydroxide, although other alkali metal hydroxide solutions may be used, as well as calcium, magnesium, strontium or barium hydroxides.

The substituted aminophenol and salicylaldehyde compounds are reacted in equal mole proportions, with the liberation of one mole of water. When desired, an excess of one of the reactants may be present in order to assure complete reaction. The resultant Schiff's base is reacted in a mole ratio of from 1:1 to 2:1 with the metal compound. Here again, an excess of one of the reactants may be present to assure complete reaction. As hereinbefore set forth, the acidic or mono salt is obtained when the reactants are used in the proportions of 2:1 of Schiff's base to nickel compound, and the neutral salt is obtained when the reactants are used in equal mole proportions. The alkali metal hydroxide is used in a proportion of two moles thereof to one mole of Schiff's base.

It is believed that the reaction proceeds first by the formation of the Schiff's base, then the replacement of the hydrogen with the alkali metal on the hydroxyl group and subsequent formation of the metal salt by reaction with the nickel compound. For example, 2-amino-4-octylphenol is reacted with salicylaldehyde to form N-salicylidene-2-hydroxy-5-octylaniline. This reacts with sodium hydroxide to form the corresponding salt. Subsequently, the sodium is removed by reaction with nickel chloride, for example, to form sodium chloride and the coordination complex or nickel salt.

As hereinbefore set forth, the inhibitors of the present invention are N-(2-hydroxyarylmethylene)-2-hydroxy-Y-arylamines and metal salts thereof. Illustrative compounds include N-salicylidene-2-hydroxy-5-propylaniline,
N-salicylidene-2-hydroxy-5-butylaniline,
N-salicylidene-2-hydroxy-5-pentylaniline,
N-salicylidene-2-hydroxy-5-hexylaniline,
N-salicylidene-2-hydroxy-5-heptylaniline,
N-salicylidene-2-hydroxy-5-octylaniline,
N-salicylidene-2-hydroxy-5-nonylaniline,
N-salicylidene-2-hydroxy-5-decylaniline,
N-salicylidene-2-hydroxy-5-undecylaniline,
N-salicylidene-2-hydroxy-5-dodecylaniline,
N-salicylidene-2-hydroxy-5-tridecylaniline,
N-salicylidene-2-hydroxy-5-tetradecylaniline,
N-salicylidene-2-hydroxy-5-pentadecylaniline,
N-salicylidene-2-hydroxy-5-hexadecylaniline,
N-salicylidene-2-hydroxy-5-heptadecylaniline,
N-salicylidene-2-hydroxy-5-octadecylaniline,
N-salicylidene-2-hydroxy-5-nonadecylaniline,
N-salicylidene-2-hydroxy-5-eicosylaniline, etc., corresponding compounds in which the alkyl group is in the 3-position, corresponding compounds in which the alkyl group is in the 4-position, corresponding compounds in which the alkyl group is in the 6-position, corresponding compounds containing two alkyl groups in the 3,5-, 4,5- or 4,6-positions on the aniline ring, N-salicylidene-2-hydroxy-5-propoxyaniline,
N-salicylidene-2-hydroxy-5-butoxyaniline,
N-salicylidene-2-hydroxy-5-pentoxyaniline,
N-salicylidene-2-hydroxy-5-hexoxyaniline,
N-salicylidene-2-hydroxy-5-heptoxyaniline,
N-salicylidene-2-hydroxy-5-octoxyaniline,
N-salicylidene-2-hydroxy-5-nonoxyaniline,
N-salicylidene-2-hydroxy-5-decoxyaniline, etc., corresponding compounds in which the alkoxy group is in the 3-positon, corresponding compounds in which the alkoxy group is in the 4-position, corresponding compounds in which the alkoxy group is in the 6-position, corresponding compounds containing two alkoxy groups, corresponding compounds containing one alkyl and one alkoxy group, corresponding compounds in which the alkyl or alkoxy group is replaced by an aralkyl, aryl, alkaryl, cycloalkyl, cycloalkylalkyl, alkylcycloalkyl, etc., substituent. The alkyl group may be a straight chain substituent or branched in varying degree. The attachment to the aromatic nucleus may be on the terminal carbon atom or any one of the internal carbon atoms.

Additional illustrative compounds include

N-[(2-hydroxyphenyl)(methyl)methylene]-2-hydroxy-5-propylaniline,
N-[(2-hydroxyphenyl)(methyl)methylene]-2-hydroxy-5-butylaniline,
N-[(2-hydroxyphenyl)(methyl)methylene]-2-hydroxy-5-pentylaniline,
N-[(2-hydroxyphenyl)(methyl)methylene]-2-hydroxy-5-hexylaniline,
N-[(2-hydroxyphenyl)(methyl)methylene]-2-hydroxy-5-heptylaniline,
N-[(2-hydroxyphenyl)(methyl)methylene]-2-hydroxy-5-octylaniline,
N-[(2-hydroxyphenyl)(methyl)methylene]-2-hydroxy-5-nonylaniline,
N-[(2-hydroxyphenyl)(methyl)methylene]-2-hydroxy-5-decylaniline,
N-[(2-hydroxyphenyl)(methyl)methylene]-2-hydroxy-5-undecylaniline,
N-[(2-hydroxyphenyl)(methyl)methylene]-2-hydroxy-5-dodecylaniline, etc., corresponding compounds in which the methyl group is replaced by a higher alkyl group selected from ethyl, propyl, butyl, pentyl, hexyl, heptyl, octyl, nonyl, decyl, undecyl, dodecyl, etc., corresponding compounds in which the aminophenol ring contains two or three alkyl groups preferably selected from those specifically recited herein, corresponding compounds in which the aminophenol ring contains alkoxy, aryloxy and/or cycloalkyloxy substituents, corresponding compounds in which the ring attached to the methylene group also contains one or more alkyl, alkoxy, aryloxy and/or cycloalkyloxy substituents. The first compound listed above is prepared by the reaction of 2-hydroxyacetophenone with 4-propyl-2-aminophenyl. The remaining compounds in the above list are prepared in substantially the same manner except that the corresponding reactants will be used. For example, in place of 2-hydroxyacetophenone, one will use 2-hydroxypropiophenone, 2-hydroxybutyrophenone, etc.

In still another embodiment the inhibitor is prepared by the reaction of 2-hydroxy-Y-arylamine with a benzophenone. Illustrative compounds of this embodiment include N-[(2-hydroxyphenyl)(phenyl)methylene]-2-hydroxy-5-propylaniline,
N-[(2-hydroxyphenyl)(phenyl)methylene]-2-hydroxy-5-butylaniline,
N-[(2-hydroxyphenyl)(phenyl)methylene]-2-hydroxy-5-pentylaniline,
N-[(2-hydroxyphenyl)(phenyl)methylene]-2-hydroxy-5-hexylaniline,
N-[(2-hydroxyphenyl)(phenyl)methylene]-2-hydroxy-5-heptylaniline,
N-[(2-hydroxyphenyl)(phenyl)methylene]-2-hydroxy-5-octylaniline,
N-[(2-hydroxyphenyl)(phenyl)methylene]-2-hydroxy-5-nonylaniline,
N-[(2-hydroxyphenyl)(phenyl)methylene]-2-hydroxy-5-decylaniline,
N-[(2-hydroxyphenyl)(phenyl)methylene]-2-hydroxy-5-undecylaniline,
N-[(2-hydroxyphenyl)(phenyl)methylene]-2-hydroxy-5-dodecylaniline, etc., corresponding compounds in which the aminophenol ring contains two or three alkyl groups preferably selected from those specifically recited herein, corresponding compounds in which the aminophenol ring contains alkoxy, aryloxy and/or cycloalkyloxy substituents, corresponding compounds in which the aniline ring contains one alkyl and one alkoxy group, corresponding compounds in which one or both of the benzophenone rings contain one or more alkyl, alkoxy, aryloxy and/or cycloalkyloxy substituents. The first compound in the above list is prepared by the reaction of 4-propyl-2-aminophenol with 2-hydroxy-benzophenone. Here again, the other compounds in the list will be prepared in substantially the same manner except that the corresponding reactants will be used.

As hereinbefore set forth, another embodiment of the invention comprises the metal salts of the specific compounds enumerated above. A preferred metal salt comprises the nickel salt. Other preferred salts comprise the lithium salt, copper salt and cobalt salt. Still other metals have been set forth hereinbefore. In the interest of simplicity, the metal salts of the specific compounds recited above are not repeated here, but it is understood that the metal salts of the specific compounds hereinbefore set forth are definitely comprised as part of the present invention and that the salt may be the acidic or neutral salt.

As hereinbefore set forth, a mixture of the acidic and neutral salts may be formed during the reaction. This mixture may be used as such without the added time and expense of separating the individual components.

From the above description it will be seen that a number of different compounds and salts thereof may be prepared and used in accordance with the present invention. However, all of these are not necessarily equivalent in the same or different plastic.

In addition to serving to inhibit deterioration of plastic due to oxidation and ultraviolet light, the additives of the present invention also serve as mold release agents, anti-blocking agents, anti-static agents, dyeing aids, etc. These additional advantages are of importance in the manufacture and use of the plastics.

While the compounds described herein are particularly useful for the stabilization of plastics, it is understood that these compounds, including the metal salts, also will have utility in other applications. For example, the metal salts of some of these compounds act as anti-knock agents to increase the anti-knock properties of gasoline. Also, some of these compounds are useful as additives to other organic substrates which may include kerosene, lubricating oil, fuel oil, grease, asphalt, adhesives, paints, etc. The compounds are also useful as catalysts, especially in the formation of acrylic esters from carbon monoxide, acetylene and alcohol.

The inhibitor of the present invention is incorporated in the plastic or other substrate in a stabilizing concentration which may range from about 0.05% to about 10% by weight and preferably from about 0.5% to about 2% by weight of the substrate. The inhibitor may be incorporated in the plastic in any suitable manner and at any suitable stage of preparation. Because the inhibitor may inhibit polymerization of the monomer, it generally is preferred to incorporate the inhibitor after the plastic is formed. In one method the plastic is recovered as powder, pellets, cylinders, spheres, sheets, rolls, bars, etc., and these may be commingled with the inhibitor in any suitable manner such as by partly melting the plastic and adding the inhibitor to the hot melt. This is readily accomplished, for example, by heating the plastic on a steam heated two-roll mill of conventional commercial design and adding the inhibitor during this operation. The plastic containing the inhibitor is recovered in sheet form and may be fabricated in any desired manner. In another method, the inhibitor is added in a Banbury mixer, an extruder or in any other suitable manner. When fibers are desired, the inhibited plastic is recovered from the Banbury mixer and is extruded through a spinnerette.

The inhibitor is utilized as such or is prepared as a solution in a suitable solvent including alcohols, and particularly methanol, ethanol, propanol, butanol, etc., hydrocarbons and particularly benzene, toluene, xylene, cumene, etc. However, the solvent must not be detrimental to the plastic and, therefore, a preferred solvent comprises the same solvent used during the manufacture or working of the plastic. It is understood that the inhibitor also may be used along with other additives incorporated in plastics for various purposes. For example, in colored plastics carbon black is used in a concentration of below about 5% by weight and generally of from about 1% to about 3% by weight. Similarly, pigments, zinc oxide, titanium oxide, etc., may be incorporated in plastics, the oxides usually being employed in a concentration of from about 2% to about 10% by weight. In many cases, silicates, dyes and/or fillers also are incorporated in the plastic.

It is understood that the inhibitor of the present invention also may be used along with other inhibitors or other ultraviolet light stabilizers. The other inhibitors generally will be of the phenolic or amine type and may include phenyl-alpha-naphthylamine, phenyl-beta-naphthylamine, phenothiazine, Nonox WSP, Nonox Cl, dialkylated phenols, trialkylated phenols, Santovox R, Santowhite, alkyl-alkoxyphenols, 2246 and 425 (American Cyanamid), diphenyl-p-phenylenediamine, dinaphthyl - p - phenylenediamine, 1,1,3-tris-(2-methyl-4-hydroxy-5-t-butylphenyl)-butane, 703 (Ethyl Corporation), Salol (salicylic acid esters), p-octylphenylsalicylate, various phosgene alkylated phenol reaction products, various alkoxyalkyldihydroxybenzophenones, polyalkyldihydroxybenzophenones, tetrahydroxybenzophenones, 2,4,5 - trihydroxybutyrophenone, etc. Other ultraviolet light stabilizers include nickel-bis-dithiocarbonates, nickel-bis-dihydroxypolyalkylphenol sulfides, dilauryl beta-mercaptodipropionate, dihydroxytetraalkyl sulfides, dihydroxytetraalkyl methanes, various trithiophosphites as trilaurylthiophosphite, dialkylphosphites, trialkylphosphites, high molecular weight nitriles, various Mannich bases, etc.

The following examples are introduced to illustrate further the novelty and utility of the present invention but not with the intention of unduly limiting the same.

*Example I*

The compound of this example is N-salicylidene-2-hydroxy-5-t-octylaniline and was prepared by the reaction of 4-t-octyl-2-aminophenol (also can be named 2-hydroxy-5-t-octylaniline) with salicylaldehyde. The t-octyl-2-aminophenol was prepared by nitrating t-octylphenol which is available commercially. The nitration was effected by gradually adding a 35% nitric acid solution in water to t-octylphenol at a temperature of 0–5° C., with stirring. The stirring was continued for a period of two hours, after which the 4-t-octyl-2-nitrophenol was water washed and reduced with hydrogen in the presence of a nickel catalyst. The 4-t-octyl-2-aminophenol was recovered as a cream color solid.

23.75 g. (0.1 mole) of the 4-t-octyl-2-aminophenol, prepared in the above manner, 12.2 g. (0.1 mole) of salicylaldehyde and 200 g. of benzene were charged into a one liter three-neck flask. The mixture was heated under reflux for about three hours. 1.6 cc. of water was collected which corresponds to the theoretical of 1.8 cc. of water. The benzene was removed by distillation at 100° C. and under vacuum at 125° C. N-salicylidene-2-hydroxy-5-t-octylaniline was recovered as a reddish solid having a melting point of 117–119° C.

*Example II*

This example describes the preparation of the neutral nickel salt of N-salicylidene-2-hydroxy-5-t-octylaniline. This preparation was made as follows: 16.25 g. (0.05 mole) of N-salicylidene-2-hydroxy-5-t-octylaniline, prepared as described in Example I, was dissolved in 150 g. of methanol and charged into a one liter three-neck flask. The solution was stirred and then 6.5 g. (0.1 mole) of potassium hydroxide, dissolved in 75 g. of warm methanol, was slowly added to the above solution with continuous stirring. 11.89 g. (0.05 mole) of nickel chloride dissolved in 100 g. of warm methanol was added dropwise to the solution over a period of about an hour, while continuously stirring the mixture. Stirring was continued for a total time of about two hours. A yellow-tan precipitate appeared, was vacuum filtered and washed with warm water and warm methanol. The precipitate is the nickel salt of N-salicylidene-2-hydroxy-5-t-octylaniline and had a melting point of above 200° C. and a nitrogen content of 14.1%. The theoretical nitrogen is 15.18%.

*Example III*

The acidic salt of the Schiff's base described in Example I was prepared as follows: 82 g. (0.25 mole) of N-salicylidene-2-hydroxy-5-t-octylaniline were dissolved in 100 g. of methanol and brought to reflux. Then 16.25 g. (0.25 mole) of potassium hydroxide, dissolved in 100 g. of warm methanol, were added dropwise within fifteen minutes. This was followed by the dropwise addition of 30 g. (0.125 mole) of nickelous chloride dissolved in 100 g. of methanol. Within ten minutes after the start of addition, yellowish plates began to precipitate. Addition of nickelous chloride was completed in forty-three minutes. After an additional ten minutes of reflux and mixing, the bright yellow precipitate was filtered off hot, washed with methanol, then copiously with water and finally with methanol. 91. g. of a mustard-yellow product were recovered. The filtrate, upon dilution with water, yielded less than 1 g. of product.

*Example IV*

The compound of this example is N-o-vanillidene-2-hydroxy-5-t-octylaniline and was prepared by the reaction of 4-t-octyl-2-aminophenol with o-vanillin (2-hydroxy-3-methoxybenzaldehyde). The reaction was effected by charging 58.5 g. (0.24 mole) of 4-t-octyl-2-aminophenol, 38 g. (0.25 mole) of o-vanillin and 200 g. of benzene into a reaction flask and refluxing the mixture for four hours. 4.5 cc. of water was collected which corresponds to the theoretical 4.5 cc. of water. The product appeared as a reddish crystalline solid which was recovered by vacuum filtering and air drying. The product had a melting point of 167–167.5° C., a basic nitrogen content of 2.88 meq./g. and a basic mole combining weight of 348 which corresponds to the theoretical mole combining weight of 355.

*Example V*

The nickel salt of N-o-vanillidene-2-hydroxy-5-t-octylaniline was prepared as follows. This preparation was made by charging 35.5 g. (0.1 mole) of N-salicylidene-2-hydroxy-5-t-octylaniline and 200 g. of methanol into a reaction flask. The mixture was heated to refluxing temperature and 13 g. (0.2 mole) of potassium hydroxide dissolved in 100 g. of methanol were slowly added thereto. 23.77 g (0.1 mole) of nickel chloride dissolved in 100 g. of warm methanol was added dropwise to the refluxing mixture over a period of about 0.5 hour. Refluxing and stirring was continued for an additional one hour, after which the precipitate was recovered by vacuum filtering, washing with warm water and warm methanol and air dried. The nickel salt of N-vanillidene-2-hydroxy-5-t-octylaniline was recovered as a dark amber solid having a nickel content of 13.44%, which corresponds to the theoretical nickel content of 14.05%.

*Example VI*

The compound of this example is N-[(2-hydroxyphenyl)(methyl)methylene] - 2 - hydroxy - 5 - sec - decylaniline and is prepared by the reaction of 4-sec-decyl-2-aminophenol with 2-hydroxyacetophenone. The reaction is effected by heating the reactants in ethanol solvent to refluxing temperature for three hours and the resulting precipitate is recovered by filtration. The precipitate is washed with warm water and ethanol and is air dried.

The cobalt salt of the above compound is prepared by first reacting one mole proportion of N-[(2-hydroxyphenyl)(methyl)methylene] - 2 - hydroxy - 5 - sec-decylaniline with one mole proportion of sodium hydroxide and then reacting with 0.5 mole proportions of cobaltous chloride.

*Example VII*

The compound of this example is N-[(2-hydroxyphenyl)(4 - methoxyphenyl)methylene] - 2 - hydroxy-5-pentoxyaniline and is prepared by the reaction of one mole proportion of 2-hydroxy-4'-methoxybenzophenone with one mole proportion of 5-pentoxy-2-hydroxyaniline at refluxing conditions in the presence of benzene solvent. The precipitate formed in the above reaction is removed by vacuum filtration and then is washed with warm water and warm isopropanol. The precipitate is air dried and comprises N-[(2-hydroxyphenyl)(4-methoxyphenyl)methylene]-2-hydroxy-5-pentoxyaniline.

The acidic copper salt of the above compound is prepared by reacting one mole proportion of the compound prepared as described in the previous paragraph with one mole proportion of potassium hydroxide and then with one-half mole proportion of cupric chloride dissolved in methanol. The acidic or mono salt is recovered as the precipitate after vacuum filtration and washing with warm water and warm methanol.

*Example VIII*

The compound of this example is the acidic lithium salt of N-salicylidene-2-hydroxy-5-t-dodecylaniline. This preparation is made by reacting one mole proportion of N-salicylidene-2-hydroxy-5-t-dodecylaniline with one mole proportion of lithium acetate in methanol solution. The reaction mixture is heated at 75° C., with stirring, for two hours. The resulting precipitate is separated by vacuum filtration, washed first with warm water, then with warm methanol and allowed to air dry.

*Example IX*

The nickel salt of N-salicylidene-2-hydroxy-5-t-octylaniline, prepared as described in Example II, was evaluated as an inhibitor in a special batch of commercial solid polypropylene. This batch of solid polypropylene was obtained free of any inhibitors in order that it may be used as a proper control sample to evaluate the effect of different inhibitors.

The solid polypropylene used in this example is stated to have the following properties:

TABLE I

| | |
|---|---|
| Specific gravity | 0.910–0.920 |
| Refractive Index, $n_D^{25}$ | 1.510 |
| Heat distortion temperature: | |
| at 66 p.s.i. load | 240° F. |
| at 264 p.s.i. load | 150° F. |
| Tensile yield strength, p.s.i. (ASTM D638–58T) (0.2″ per min.) | 4700 |
| Total elongation, percent | 300–400 |
| Stiffness flexural (ASTM D747–50) $10^5$ p.s.i. | 1.8 |
| Shore hardness (ASTM D676–55T) | 74D |

In one method the solid polypropylene was evaluated in an Atlas type DL–TS Weather-Ometer. The Weather-Ometer may be operated with or without the use of water sprays to simulate accelerated moist weathering. In the present runs, the water sprays were not used, thereby simulating and accelerating the effect of hot airy weathering, a much more severe condition. Polypropylene pellets were milled in a two-roll heated mill of conventional commercial design and the inhibitor was incorporated in the samples during the milling. The samples were pressed into sheets of 17-mil. thickness and cut into plaques of 1⅜″ x 1½″. The plaques then were inserted into plastic holders, affixed onto a rotating drum and exposed to carbon arc rays at about 52° C. in the Weather-Ometer. Periodically samples of the polypropylene were subjected to infrared analysis and the intensity of the carbonyl band at 1715 cm.$^{-1}$ was determined and expressed as "carbonyl number." As hereinbefore set forth, the formation of carbonyl groups is an indication of deterioration of the polyolefin. The higher intensity of the carbonyl band indicates a higher carbonyl concentration (expressed as carbonyl number) and accordingly increased deterioration. The number of hours required to effect an increase in carbonyl content of 100 numbers is taken as the induction period.

Samples of the polypropylene also were evaluated by outdoor exposure. The plaques of polypropylene prepared in the above manner were exposed to weathering on an outdoor rack facing south and inclined at a 45° angle at Des Plaines, Ill. Here again, the samples were analyzed for carbonyl formation in the manner described in the previous paragraph. Here again, the number of days required to effect an increase in carbonyl content of 100 numbers is taken as the induction period.

The results of evaluations in the Weather-Ometer and outdoor exposure are reported in the following table for a sample of the polypropylene without added inhibitor and for a sample containing 1% by weight of the nickel salt of N-salicylidene-2-hydroxy-5-t-octylaniline.

TABLE II

| Additive | Weather-Ometer Induction Period (Hours) | Outdoors Induction Period (Days) |
|---|---|---|
| None | <48 | <54 |
| 1% by wt. of nickel salt of N-salicylidene-2-hydroxy-5-t-octylaniline | 2,510 | >381 |

From the data in the above table, it will be seen that the inhibitor was extremely effective in retarding deterioration of the polypropylene. The sample of plastic without inhibitor placed outdoors was very brittle after the induction period. In contrast, the sample containing the inhibitor after exposure for 381 days still was in good physical condition. The actual change in carbonyl content in the sample containing inhibitor was from an initial of 138 to a final of 184 after 381 days. The evaluation of the sample is being continued because the sample has not as yet developed an increase of 100 numbers in carbonyl content.

*Example X*

Another preparation similar to that of Example II was evaluated in another commercial solid polypropylene. Here again, the sample used in this run was a special sample of the polypropylene free of added inhibitor. The polypropylene of this example is available commercially from Montecatini under the trade name of "Moplen" and is believed to be of similar properties to the polypropylene described in Example IX.

This polypropylene was evaluated in outdoor exposure in the same manner as described in Example IX and the results thereof are reported in the following table:

TABLE III

| Additive: | Outdoors induction period, days |
|---|---|
| None | <14 |
| 1% by wt. of nickel salt of N-salicylidene-2-hydroxy-5-t-octylaniline | >204 |

In the sample without inhibitor, the carbonyl number started at 166 and increased to greater than 1000 after 28 days of outdoor exposure. In contrast, the sample containing the inhibitor started at a carbonyl number of 138 and went to only 212 after 204 days of exposure. Here again, it will be noted that the test is still being continued since the sample containing inhibitor had not yet developed an increase in carbonyl content of 100 numbers.

*Example XI*

This example describes the results obtained with a mixture of equal concentrations of N-salicylidene-2-hydroxy-5-t-octylaniline, prepared as described in Example I, and the nickel salt thereof, prepared as described in Example II, in another sample of the solid polypropylene described in Example IX. This test was conducted in the same manner described in Example IX and the results thereof are reported in the following table. For comparative purposes, the results using a sample of the polypropylene without inhibitor are repeated in the following table:

TABLE IV

| Additive | Weather-Ometer Induction Period (Hours) | Outdoors Induction Period (Days) |
|---|---|---|
| None | <48 | <54 |
| 0.5% by wt. of N-salicylidene-2-hydroxy-5-t-octylaniline+0.5% by wt. of the nickel salt of the above compound | 1,872 | >280 |

From the data in the above table, it will be seen that the mixed inhibitor also served to considerably extend the induction period in both the Weather-Ometer and outdoor exposure. Here again, the test using the sample containing the inhibitor is being continued since an increase of 100 numbers in carbonyl content has not been reached, the initial carbonyl reading being 143 and the final reading being 180 after 280 days. The polypropylene was in good condition after exposure for 280 days in contrast to the very brittle condition of the sample not containing inhibitor after only 28 days of exposure outdoors. The same conclusion applies to the samples after exposure in the Weather-Ometer.

*Example XII*

This example reports evaluations made in a special batch of commercial solid polyethylene. As hereinbefore set forth, a special batch of the solid polyolefin was obtained free of any inhibitors in order that it may be used as a proper control sample to evaluate the effect of different inhibitors. The solid polyethylene is of the high density type and the inhibited product is marketed commercially under the trade name of "Fortiflex" by the Celanese Corporation of America.

A sample of the polyethylene without inhibitor and a sample of the polyethylene with 1% by weight of the nickel salt of N-salicylidene-2-hydroxy-5-t-octylaniline, prepared as described in Example II, were evaluated in outdoor exposure in the same manner as described in Example IX. The results of these tests are reported in the following table.

TABLE V

Additive: Outdoors induction period, days
None _____ 42
1% by wt. of nickel salt of N-salicylidene-2-hydroxy-5-t-octylaniline _____ >364

In the sample of polyethylene without inhibitor, the initial carbonyl content of 30 increased to 604 after 100 days of outdoor exposure. In contrast, the sample of polyethylene containing inhibitor increased from an initial reading of 18 to only 54 after 364 days of outdoor exposure. Here again, the outdoor test is being continued because the sample did not reach the induction period.

*Example XIII*

This example reports results of evaluations made in a low density polyethylene commercially available from the Visking Corporation.

The outdoor exposure evaluations were made in the same manner as described in Example IX and the results of tests run with a sample of the polyethylene without the inhibitor and a sample of the polyethylene with inhibitor are reported in the following table.

TABLE VI

Additive: Outdoors induction period, days
None _____ 28
1% by wt. of nickel salt of N-salicylidene-2-hydroxy-5-t-octylaniline _____ >304

In the sample of polyethylene without inhibitor the carbonyl content increased from an initial reading of 30 to a final reading of greater than 1000 after 189 days of outdoor exposure. In contrast, the sample of polyethylene containing the inhibitor increased from an initial carbonyl content of 64 to a final reading of 105 after 304 days of outdoor exposure. Here again, it will be noted that the test is being continued since the sample had not increased 100 numbers in carbonyl content.

*Example XIV*

Samples of the polyethylene described in Example XIII also were evaluated by a thermal oxidation method. This method is described in a paper by W. L. Hawkins et al. of the Bell Telephone Laboratories, Inc., entitled, "The Effect of Carbon Black on Thermal Antioxidants for Polyethylene," which paper appeared in the Journal of Applied Polymer Science, vol. 1, issue 1, pages 21–42 (1949). The method used in this test was modified in that an electrically heated aluminum block rather than an oven was used to maintain the desired temperature and the oxygen absorption of the sample was determined manometrically rather than volumetrically. In this method samples of the polyethylene, weighing about 0.5 g. each, were placed in separate 8 ml. glass tubes and the tubes then were inserted into horizontal rows of openings located concentrically around the heater. The temperature is maintained at about 140° C. The glass tubing also was packed with glass wool and molecular sieves to absorb the gases. Each of the glass tubes is connected to individual manometers containing mercury and the differential pressure is periodically determined. The induction period is taken as the number of hours required to reach a differential pressure of 20 cm. Hg.

The results of evaluation by this method of a sample of the polyethylene without inhibitor and of a sample of the polyethylene containing 0.075% by weight of the nickel salt of Example II are reported in the following table.

TABLE VII

Additive: Induction period, hours
None _____ 6
0.075% by wt. of nickel salt of N-salicylidene-2-hydroxy-5-t-octylaniline _____ 92

From the above data, it will be seen that the inhibitor was very effective in retarding oxidative deterioration of the polyethylene.

*Example XV*

Samples of the polyethylene described in Example XII also were evaluated by the thermal oxidation method described in Example XIV. The results of these evaluations are shown in the following table.

TABLE VIII

Additive: Induction period, hours
None _____ 11
0.075% by wt. of nickel salt of N-salicylidene-2-hydroxy-5-t-octylaniline _____ 59

*Example XVI*

As hereinbefore set forth, the inhibtor of the present invention may be used along with other additives. This example describes the results obtained when using 0.5% by weight of the nickel salt of N-salicylidene-2-hydroxy-5-t-octylaniline, prepared as described in Example II, with 0.15% by weight of bis-(3-methyl-4-hydroxy-5-t-butyl)-diphenylmethane. When evaluated outdoors in another sample of the solid polypropylene described in Example X, the induction period of the sample of polyolefin containing the mixed inhibitor was greater than 204 days. The sample of polypropylene, after exposure for 204 days, was of satisfactory strength and did not undergo color change during such exposure.

*Example XVII*

N-salicylidene-2-hydroxy-5-hexadecylaniline is prepared by the reaction of 4-hexadecyl-2-aminophenol with salicylaldehyde. The nickel salt thereof is prepared by reacting one mole proportion thereof with two mole proportions of potassium hydroxide and then with one mole proportion of nickel chloride. The resultant nickel salt is used as an inhibitor in solid polybutylene. The inhibitor is incorporated by hot melt addition of the inhibitor to the polybutylene being heated and pressed on a conventional two-roll steam heated mill. The polybutylene sheets then are heat-compressed to a thickness of 20 mils, cut into plaques of 1½" x 1½" and mounted in plastic holders. The plaques are evaluated both in the Weather-Ometer and by outdoor exposure in the manner hereinbefore described in detail. The addition of the inhibitor serves to effectively inhibit carbonyl development.

*Example XVIII*

The nickel salt of N-salicylidene-2-hydroxy-5-t-octylaniline, prepared as described in Example II, is used as an inhibitor in polystyrene. The inhibitor is incorporated in a concentration of 0.5% by weight in polystyrene by partly melting the polystyrene and incorporating the inhibitor in the hot melt. The polystyrene containing the inhibitor is of improved resistance to deterioration by ultraviolet light and due to oxidation.

*Example XIX*

The nickel salt of N-salicylidene-2-hydroxy-5-t-octylaniline is utilized as an inhibitor in polyvinyl chloride plastic. Here again, the inhibitor is incorporated by partly melting the polyvinyl chloride plastic and incorporating the inhibitor in the hot melt in a concentration of 1% by weight. This serves to inhibit deterioration of the polyvinyl chloride plastic due to ultraviolet light and oxidation.

*Example XX*

The nickel salt of N-salicylidene-2-hydroxy-5-t-octylaniline, prepared as described in Example II, is utilized in a concentration of 0.5% by weight in nylon. The inhibitor is incorporated in a Banbury mixer and the nylon is formed into fibers in a spinnerette. This serves to inhibit deterioration of the nylon due to ultraviolet light and oxidation.

We claim as our invention:

1. A compound selected from the group consisting of N-(2-hydroxyphenylmethylene) - 2-hydroxy-Y-arylamine in which the aryl contains from 1 to 2 carbocyclic rings and Y is selected from the group consisting of hydrocarbyl and hydrocarbyloxy of at least 3 carbon atoms and metal salts thereof in which the metal is selected from the group consisting of nickel, copper, cobalt, lithium, antimony, cadmium, lead, tin, uranium, vanadium, zinc, iron and mercury.

2. N-(2-hydroxyarylmethylene) - 2 - hydroxy-Y-arylamine in which the aryl contains from 1 to 2 carbocyclic rings and where Y is selected from the group consisting of hydrocarbyl and hydrocarbyloxy of at least three carbon atoms.

3. A metal salt of N-(2-hydroxyarylmethylene)-2-hydroxy-Y-arylamine in which the aryl contains from 1 to 2 carbocyclic rings and where Y is selected from the group consisting of hydrocarbyl and hydrocarbyloxy of at least three carbon atoms and in which the metal is selected from the group consisting of nickel, copper, cobalt, lithium, antimony, cadmium, lead, tin, uranium, vanadium, zinc, iron and mercury.

4. A nickel salt of N-(2-hydroxyarylmethylene)-2-hydroxy-Y-arylamine in which the aryl contains from 1 to 2 carbocyclic rings and where Y is selected from the group consisting of hydrocarbyl and hydrocarbyloxy of at least three carbon atoms.

5. N-salicylidene-2-hydroxy-5-alkylaniline having from about 5 to about 20 carbon atoms in said alkyl group.

6. A metal salt of N-salicylidene-2-hydroxy-5-alkylaniline having from about 5 to about 20 carbon atoms in said alkyl group and in which the metal is selected from the group consisting of nickel, copper, cobalt, lithium, antimony, cadmium, lead, tin, uranium, vanadium, zinc, iron and mercury.

7. A nickel salt of N-salicylidene-2-hydroxy-5-alkylaniline having from about 5 to about 20 carbon atoms in said alkyl group.

8. N[(2-hydroxyphenyl)(alkyl)methylene]-2-hydroxy-5-alkylaniline having from about 5 to about 20 carbon atoms in said alkyl group.

9. N-[(2-hydroxyphenyl)(phenyl)methylene] - 2 - hydroxy-5-alkylaniline having from about 5 to about 20 carbon atoms in said alkyl group.

References Cited

UNITED STATES PATENTS 2,355,257  8/1944  Badertscher _____ 260—429
3,192,161  6/1965  Wisotsky _____ 260—439

TOBIAS E. LEVOW, *Primary Examiner.*

W. F. W. BELLAMY, *Assistant Examiner.*